(12) United States Patent
Itoh et al.

(10) Patent No.: US 9,766,664 B2
(45) Date of Patent: Sep. 19, 2017

(54) METHODS AND ARRANGEMENTS FOR ACCESSING WIRELESSLY CONNECTED EXTERNAL STORAGE DEVICES

(75) Inventors: Kishiko Itoh, Machida (JP); Seiichi Kawano, Saganihara (JP); Susumu Shimotono, Hadano (JP); Jun Sugiyama, Sagamihara (JP); Hidenori Kinoshita, Machida (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 900 days.

(21) Appl. No.: 12/357,842

(22) Filed: Jan. 22, 2009

(65) Prior Publication Data
US 2009/0187678 A1    Jul. 23, 2009

(30) Foreign Application Priority Data
Jan. 22, 2008   (JP) .................................. 2008-011871

(51) Int. Cl.
| H04B 7/00 | (2006.01) |
| G06F 1/16 | (2006.01) |
| H04W 4/00 | (2009.01) |
| H04W 4/02 | (2009.01) |

(52) U.S. Cl.
CPC .......... *G06F 1/1677* (2013.01); *H04W 4/008* (2013.01); *H04W 4/025* (2013.01)

(58) Field of Classification Search
CPC ......... H04W 4/02; H04W 4/20; H04W 88/08; H04W 92/10; H04W 4/008; H04W 4/025; G06F 1/1677; G06F 1/1632

USPC ..... 709/224; 710/20; 455/556.1, 556.2, 557, 455/421, 422.1, 456.1
See application file for complete search history.

(56) References Cited

U.S. PATENT DOCUMENTS

| 7,203,487 | B2 * | 4/2007 | Comp ........................ 455/422.1 |
| 7,849,177 | B2 * | 12/2010 | Uhlik ............................. 709/223 |
| 7,965,646 | B2 * | 6/2011 | Casey ........................ 370/241.1 |
| 7,996,045 | B1 * | 8/2011 | Bauer et al. .................. 455/566 |
| 8,068,864 | B2 * | 11/2011 | Lazaridis et al. ............. 455/466 |

(Continued)

FOREIGN PATENT DOCUMENTS

| JP | 2000-047763 | 2/2000 |
| JP | 2001-167038 | 6/2001 |

(Continued)

*Primary Examiner* — Ernest Unelus
(74) *Attorney, Agent, or Firm* — Ference & Associates LLC

(57) ABSTRACT

The invention provides a method for a portable electronic device such as a computer to be capable of safely coping with the occurrence of a surprise removal from an external hard disk drive (HDD) connected by wireless. An HDD is connected to a portable computer by wireless via a wireless extension device. First, a wireless communication path between the HDD and the portable computer is configured. Subsequently, a file is read and edited by accessing the HDD from the portable computer. Next, removal information indicating that the portable computer is away from the HDD is produced. The removal information can be produced by detecting an acceleration generated in the portable computer, or by directly detecting the distance by the strength of the wireless signal. Data under editing is saved before occurrence of surprise removal by ejecting the HDD in response to the production of the removal information.

19 Claims, 6 Drawing Sheets

(56) References Cited

U.S. PATENT DOCUMENTS

| | | | |
|---|---|---|---|
| 2003/0073432 A1* | 4/2003 | Meade, II | 455/420 |
| 2003/0088780 A1* | 5/2003 | Kuo et al. | 713/185 |
| 2003/0148760 A1* | 8/2003 | Takayanagi | 455/420 |
| 2004/0263388 A1* | 12/2004 | Krumm et al. | 342/451 |
| 2005/0143119 A1* | 6/2005 | Chandra et al. | 455/522 |
| 2005/0185615 A1* | 8/2005 | Zegelin | 370/331 |
| 2005/0227707 A1* | 10/2005 | Law et al. | 455/456.1 |
| 2006/0163349 A1* | 7/2006 | Neugebauer | G06Q 20/387 235/383 |
| 2006/0294230 A1* | 12/2006 | Takasu | 709/224 |
| 2008/0246888 A1* | 10/2008 | Oh et al. | 348/730 |
| 2008/0268816 A1* | 10/2008 | Wormald | 455/412.2 |
| 2009/0019152 A1* | 1/2009 | Huang | 709/224 |
| 2009/0080562 A1* | 3/2009 | Franson | 375/268 |
| 2010/0035598 A1* | 2/2010 | Lee et al. | 455/421 |
| 2010/0041331 A1* | 2/2010 | Helferich | 455/3.06 |

FOREIGN PATENT DOCUMENTS

| | | |
|---|---|---|
| JP | 2002-330328 | 11/2002 |
| JP | 2004-282722 | 10/2004 |
| JP | 2005-520247 | 7/2005 |
| JP | 2006-301770 | 11/2006 |
| JP | 2007-006106 | 1/2007 |
| WO | 02-103497 A1 | 12/2002 |
| WO | 2007-077769 A1 | 7/2007 |

\* cited by examiner

METHODS AND ARRANGEMENTS FOR ACCESSING WIRELESSLY CONNECTED EXTERNAL STORAGE DEVICES

CLAIM FOR PRIORITY

This application claims priority from Japanese Patent Application No. 2008-011871, filed on Jan. 22, 2008, and which is fully incorporated by reference as if set forth herein.

FIELD OF THE INVENTION

The present invention generally relates to a technique for controlling the state of a computer while the computer is away from an external storage device connected thereto by wireless but outside its wireless communication zone.

BACKGROUND OF THE INVENTION

The standardization of the WPAN (Wireless Personal Area Network) standards is being made as the 802.15 standards under the IEEE 802 Committee. A high-speed short-range communication method called UWB (Ultra Wide Band) is one of the communication methods adopted in the WPAN. According to the UWB specifications, it permits data rates as high as 110 Mbps at a communication distance of 10 meters in radius and 480 Mbps at a communication distance of 3 meters in radius.

In recent years, a notebook type personal computer (hereinafter, referred to as a notebook PC) allows connections with digital consumer electronics, mobile apparatuses or peripheral devices by using a wireless shared platform in compliance with the UWB. The wireless shared platform is configured by a UWB physical layer and a UWB-MAC layer. Moreover, in order for the UWB wireless shared platform to be shared with various applications or protocols such as the wireless USB (WUSB: Wireless Universal Serial Bus) or the wireless IEEE 1394, a convergence layer is defined above the UWB-MAC layer.

As one of the peripheral devices of the notebook PC, there is known a function expansion device called a port replicator. The port replicator is provided with connection terminals such as serial ports, parallel ports, and ETHERNET connectors, and the port replicator may be placed on a desk so that peripheral devices less frequently used may preliminarily be connected thereto. Moreover, the main body of a notebook PC has been designed to be small in size and lightweight in order to be used in a mobile environment. On the other hand, in an office environment, the notebook PC is connected to the port replicator so that functions equivalent to a desktop computer can be used.

Japanese Patent Application Laid-Open No. 2001-167038, discloses a technique in which, when a mechanical lock mechanism is not present between a docking station and a PC, a device driver is unloaded before entering into a suspend or hibernation state so that the PC can be solely operated even when the PC is undocked from the docking station during the suspend state.

Japanese Patent Application Laid-Open No. 2000-047763, discloses a technique in which in order to solve a problem that prevents a computer from resuming its operation when a resume function is performed after a CD-ROM is removed during a suspend state, the connection state of the CD-ROM is checked when performing the resume function to thereby control subsequent accesses to the CD-ROM.

Japanese Patent Application Laid-Open No. 2004-282722 discloses a technique that notifies a user of a communication state between a docking station and a computer by means of an LED's lighting state. Japanese Patent Application Laid-Open No. 2006-301770, discloses a method that interrupts a safety remove operation when accesses are continuously made to a docking station and displays a message indicating that the docking station cannot be removed.

In recent years, a wireless port replicator or a wireless docking station (hereinafter collectively referred to as WPR) capable of connecting a port replicator and a notebook PC by using a wireless platform of UWB has been developed. The WPR may be connected to a magnetic disc device (hereinafter referred to as HDD) by wire. A user reads files from the HDD to edit them or newly creates files with the notebook PC to write them into the HDD. The user may sometimes carry the notebook PC to be away from the WPR before the files are written to the HDD or the files are completely read from the HDD.

On one hand, connecting the notebook PC and the port replicator by wireless frees a user from burdensome physical connecting operations to thereby provide agreeable working environment. On the other hand, the user becomes less aware of the state where the notebook PC is connected to the WPR. As a result, there is increasing possibility of occurrence of a so-called surprise removal wherein the notebook PC is carried outside a wireless communication zone before data being edited is saved or files being read are completely read. Although the UWB communication distance is about 10 meters in radius, when the distance between the notebook PC and the WPR exceeds the UWB communication distance, the wireless communication path between the notebook PC and the HDD may be cut off. Therefore, since it is difficult to obtain the data under reading or store it in the HDD at the moving destination, there may be a case where the data is lost due to operation errors with respect to the edited data.

When the notebook PC and the port replicator are connected by wire, it is easy to recognize the disconnection from the HDD when the port replicator is ejected, and it can be expected that the user will preliminarily save the data being edited or to confirm that the data being read has been completely read. Moreover, attachment/removal can be followed by operating an eject button, which is made to be impossible to unlock the eject button, which is normally mechanically locked, before the ejection operation is completed.

However, when the notebook PC and the port replicator are connected wirelessly, the same measures taken when connected by wire cannot be taken wirelessly. Moreover, the surprise removal problem occurs when the resume function is performed after the notebook PC is carried outside of the wireless communication zone after transitioning to the suspend or hibernation state in a state of being connected to the WPR.

Therefore, a need has been recognized for providing an access method for a portable computer capable of preventing the occurrence of a surprise removal with respect to a wirelessly connected external storage device.

SUMMARY OF THE INVENTION

The present invention generally relates to an access method executed by a portable computer capable of preventing the occurrence of a surprise removal with respect to a wirelessly connected external storage device.

In summary, one aspect of the invention provides a method comprising: configuring a wireless communication path between an external storage device and a computer, accessing the external storage device from the computer; producing removal information, and preventing a surprise removal.

An additional aspect of the invention provides an apparatus comprising: a connection recognition arrangement configured to recognize that an external storage device is connected wirelessly to the apparatus, and a surprise removal prevention arrangement.

A further aspect of the present invention provides a program storage device readable by machine, tangibly embodying a program of instructions executed by the machine to perform steps, the steps comprising: configuring a wireless communication path between an external storage device and a computer, accessing the external storage device from the computer, producing removal information, preventing a surprise removal, and ejecting the external storage device, wherein ejection comprises saving data to the external storage device prior to ejecting the external storage device.

For a better understanding of the present invention, together and with other and further features and advantages thereof, reference is made to the following description, taken in conjunction with the accompanying drawings, and the scope of the invention will be pointed out in the appended claims.

DETAILED DESCRIPTION OF THE INVENTION

Figure 1A:
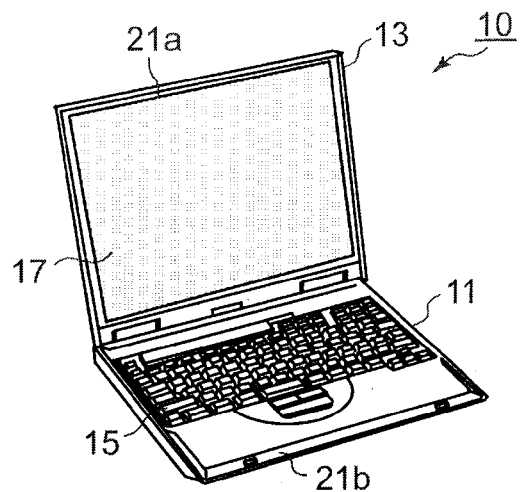
FIGS. 1(A-C) are external views of a notebook PC and a wireless extension device according to an embodiment of the present invention.

It will be readily understood that the components of the present invention, as generally described and illustrated in the figures herein, may be arranged and designed in a wide variety of different configurations. Thus, the following more detailed description of the presently preferred embodiments of the present invention, as represented in the figures, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices that are consistent with the invention as claimed herein. The detailed description of the invention will briefly review some conventional arrangements and problems associated therewith in order to highlight some features of the instant invention (providing solutions to these problems). The description will then proceed with a more detailed description of preferred embodiments according to the present invention.

According to at least one preferred embodiment of the present invention, there is provided an access method executed by a portable computer to an external storage device connected by wireless. First, a wireless communication path is configured between the external storage device and the portable computer. Then, the external storage device is accessed from the portable computer. The content of the access includes applications reading and editing files from the external storage device.

Subsequently, the portable computer produces removal information indicating that the portable computer is away from the external storage device. The removal information is information indicating a possibility that a distance between the portable computer and the external storage device becomes distant, and the information may be produced by detecting by means of an acceleration, a change in the position of the portable computer, serving as the premise for the distance becoming distant or by directly detecting a change in the distance by means of the strength of electric waves. Then, the portable computer ejects the external storage device in response to the production of the removal information.

The ejection is an operation of safely cutting the wireless communication path between the external storage device and the portable computer. Therefore, where there is unsaved data being edited or data being read, the external storage device is removed after the saving and reading are completed. By allowing quick ejection based on the removal information, it is possible to eliminate problems such as the case where the data being edited is lost outside the wireless communication zone in response to the occurrence of a surprise removal or the case where files to be read are not read.

Even when such a configuration is employed, there may be anticipated a case where a user hastily carries the portable computer outside of the wireless communication zone until the ejection of the external storage device is completed after the removal information is produced, and thus the surprise removal still occurs. Such a case may be coped with by sending a notification of an alert to the user in response to the production of the removal information to thereby call the user's attention. When the alert is stopped in response to the saving of the data being edited, the user can recognize that it has become safe to remove the portable computer to outside of the wireless communication zone.

When the sleep event is produced, the sleep event is held for a moment so that the external storage device is first ejected in response to the sleep event. Then, in response to the completion of the ejection, the sleep event is executed. As a result, the possibility of a surprise removal occurring in the sleep state is eliminated, and the danger that data to be saved to the external storage device will be lost due to operation errors when a resume function is performed is thereby eliminated.

According to another preferred embodiment of the present invention, there is provided another access method executed by a portable computer to an external storage device connected by wireless. A wireless communication path is configured between the external storage device and the portable computer, and files stored in the external storage device are read and edited. When removal information indicating that the portable computer is away from the external storage device is produced, data being edited is saved to the external storage device in response to the production of the removal information. Therefore, it is possible to prevent a surprise removal from occurring without intervention of the ejection operation.

In accordance with the above-mentioned aspects of the present invention, it is possible to provide an access method for a portable computer capable of preventing the occurrence of a surprise removal with respect to a wirelessly connected external storage device. Moreover, it is possible to provide a portable computer and a computer program realizing the access method.

Referring now to the figures, the instant invention will be described with reference to the figures herein and the scope of the invention will be pointed out in the pending claims.

FIGS. 1(A-C) are external views of a notebook PC 10 and a wireless extension device 100 according to an embodiment of the present invention. The notebook PC 10 includes an input device 15, such as a keyboard and a pointing device, provided in a system casing 11 and a liquid crystal display device (LCD) 17 mounted on a display casing 13. The display casing 13 is connected via a hinge to the system casing 11 to be opened and closed. The display casing 13 has a permanent magnet 21a embedded therein, and the system casing 11 has a read sensor 21b constituting a switch circuit being embedded between the permanent magnet 21a and the system casing 11.

Figure 1B:
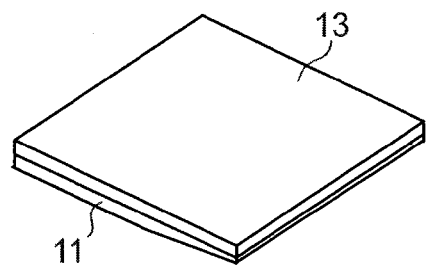

FIG. 1A illustrates a state where the display casing 13 is opened so that the notebook PC 10 can be used with the LCD 17 and the input device 15 serving as a user interface. FIG. 1B illustrates a state where the display casing 13 is closed. In the state where the display casing 13 is closed, the notebook PC 10 is usually in a non-operating state, but when a wireless extension device 100 is used, there may be a case where the notebook PC 10 operates in the closed state.

Figure 1C:
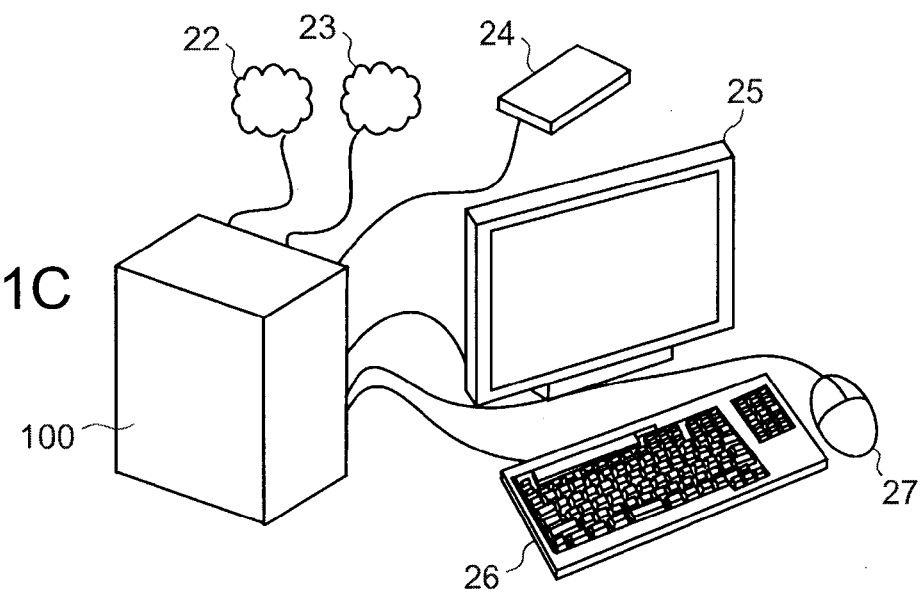

FIG. 1C illustrates a state where a plurality of devices is connected to the wireless extension device 100. The wireless extension device 100 is a function expansion device of the notebook PC 10, which is called a docking station, a port replicator, or the like. The wireless extension device 100 is connected via a WUSB (Wireless Universal Serial Bus) to the notebook PC 10 and provided with a plurality of ports such as a LAN port, a modem port, a USB port, a VGA port, and a PS2 port. The LAN port is connected to a wired LAN 22 via an Ethernet cable, and the modem port is connected to a public telephone line 23 via a modem cable.

The USB port is connected to an external HDD 24 compatible with an USB interface or other USB device, the VGA port is connected to an external display device 25, and the PS2 port is connected to an external keyboard 26 and an external mouse 27. The notebook PC 10 can communicate with the wireless extension device 100 to connect to the wired LAN 22 or use the keyboard 26 in a state where the display casing 13 is opened or closed. For example, the wireless extension device 100 and the notebook PC 10 can be connected wirelessly in the state illustrated in FIG. 1B so that the notebook PC 10 accesses the HDD 24 with the display device 25, the keyboard 26, and the mouse 27 being used as a user interface.

Figure 2:
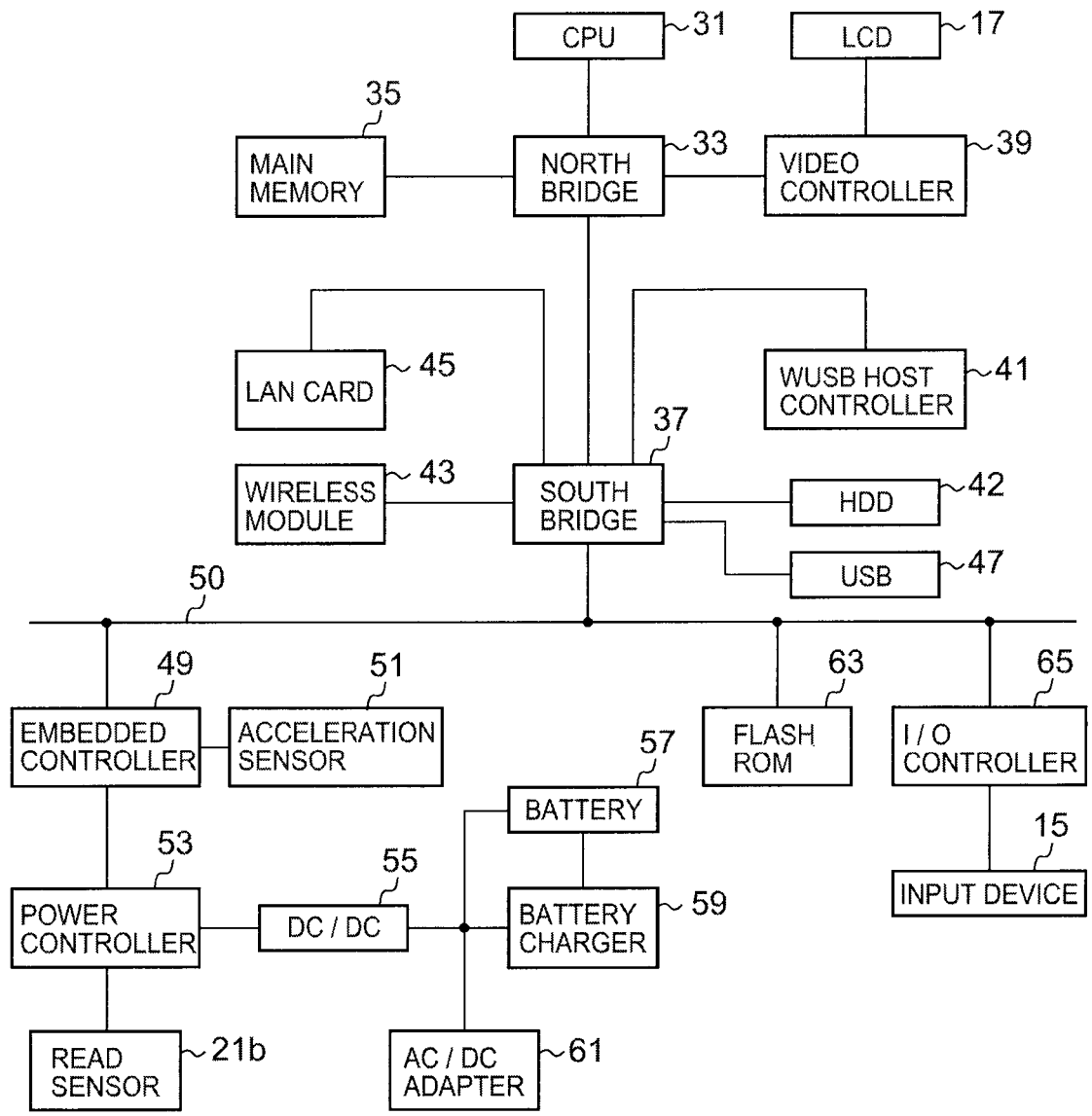
FIG. 2 is a schematic block diagram illustrating a configuration of hardware components installed in the notebook PC 10.

FIG. 2 is a schematic block diagram according to an embodiment of the present invention, illustrating a configuration of hardware components installed in the notebook PC 10. A CPU 31 is an arithmetic processing device performing the central function of the notebook PC 10 and executes an operating system (OS), a BIOS, a device driver, or application programs. The CPU 31 controls a north bridge 33 and devices connected to the north bridge 33 via various buses. The north bridge 33 has a memory controller function for controlling an operation of accessing a main memory 35, a data buffer function for absorbing a difference in a data transfer rate between the CPU 31 and other device, and the like.

The main memory 35 is a random access memory (RAM) used as a read area of programs executed by the CPU 31 and a work area to which processed data are written. A video controller 39 is connected to the north bridge 33, provided with a graphic accelerator and a VRAM, and configured to receive a drawing command from the CPU 31 to produce images to be drawn and write the images in the VRAM and to deliver images read out of the VRAM to the LCD 17 as a drawing data.

A south bridge 37 is connected to the north bridge 33 and is provided with interfaces for various peripheral input/output devices and ports for a PCI bus and a PCI-Express bus. The south bridge 37 is connected to slots of respective buses, a LAN card 45, a WUSB host controller 41, a wireless module 43, a HDD 42, a USB connector 47, and the like.

The LAN card 45 is an expansion card for connecting to a LAN using the Ethernet standard and is connected to the south bridge 37 via a PCI bus while allowing the notebook PC 10 in the case of being used solely to connect by wire to the LAN by means of a connector using the RJ-45 standard mounted on the system casing 11.

The WUSB host controller 41 uses hardware components forming a UWB physical layer and a UWB MAC layer as a wireless platform on which functions defined by the WUSB protocol are implemented. The WUSB host controller 41 is connected to a PCI slot connected to the south bridge 37, and configures a hub-and-spoke type bus similar to a wired USB to thereby control WUSB devices connected to the bus in a collective manner. The content of the control includes detecting connection and ejection of WUSB devices, management of control flows and data flows between the WUSB host controller 41 and the WUSB devices, and the like. In the present embodiment, the wireless extension device 100 serves as the WUSB device so that it is connected to the WUSB host controller 41 by wireless.

The wireless module 43 is compatible, for example, with MIMO (Multiple Input Multiple Output) wireless communication in compliance with the IEEE 802.11n and is connected to the south bridge 37 via a PCI Express X1 bus to thereby control data communication between the wireless module 43 and a wireless network such as a WAN or a LAN. The south bridge 37 also includes the functions of a serial ATA interface and a USB interface and is connected to the HDD 42 via a serial ATA. In the HDD 42, well-known programs such as an OS, a device driver or an application program and programs according to the present embodiment are stored. A description of a configuration of the programs according to the present embodiment will be provided later with reference to FIG. 4.

The south bridge 37 is also connected via a PCI bus or an LPC bus 50 to legacy devices which have been used in the notebook PC 10 from the past or to devices not requiring high-speed data transmission. The LPC bus 50 is connected to an embedded controller (EC) 49, an I/O controller 65, a flash ROM 63 storing a BIOS, and the like. The EC 49 is a microcomputer configured by an 8 to 16 bit CPU, a ROM, a RAM, and the like, and is further provided with a multi-channel A/D input terminal, a multi-channel D/A output terminal, a timer, and a digital input/output terminal. The EC 49 is connected to a power controller 53 for controlling an acceleration sensor 51 and a power supply unit via such input/output terminals and is thus able to execute a program for managing an internal operating environment of the notebook PC 10 independently of the CPU 31.

The acceleration sensor 51 detects an acceleration occurring when the notebook PC 10 is carried by a user away from the wireless extension device 100 to output the acceleration to the EC 49 as an analog signal. The EC 49 converts the acceleration information received from the acceleration sensor 51 to a digital signal and stores the digital signal in an internal RAM. The EC 49 and the power controller 53 are connected by an SPI (Serial Peripheral Interface) which is a specialized bus.

The power controller 53 is connected to the read sensor 21*b* and a DC-DC converter 55. When the display casing 13 is closed, the permanent magnet 21*a* embedded in the display casing 13 is moved closer to the read sensor 21*b* installed in the system casing 11. Then, the read sensor 21*b* is able to detect whether the notebook PC 10 is closed or opened, by means of magnetic flux from the permanent magnet 21*a*.

The DC-DC converter 55 converts DC electric power supplied from an AC/DC adapter 61 or a battery 57 to a plurality of voltages necessary for operating the notebook PC 10 and then supplies electric power to respective devices based on electric power supply categories defined in accordance with a power supply mode. The AC/DC adapter 61 has a primary side thereof connected to a commercial power supply to thereby convert an AC voltage to a DC voltage and a secondary side thereof configured to be detachably connected to the notebook PC 10. When the AC/DC adapter 61 is connected to the notebook PC 10, it supplies electric power to the DC-DC converter 55 and a battery charger 59 charging the battery 57.

The notebook PC 10 is compatible with an ACPI type power saving function. The EC 49 controls the DC-DC converter 55 with intervention of the power controller 53, selects devices to be operated based on respective power supply states such as a soft-off state, a suspend state, a hibernation state, or an ON state, as defined by the power supply mode of the notebook PC 10, and supply electric power to the selected devices. Here, the suspend state refers to a state where electric power is supplied to devices necessary for storing application or system states during the ON state in the main memory 35 and other minimally necessary devices.

The hibernation state refers to a state where the application or system states during the ON state are stored in the HDD 42 and electric power is supplied to the minimally necessary devices. Both the suspend state and the hibernation state are the power saving functions that store states under processing in the main memory 35 or the HDD 42 and stop the supply of electric power to unnecessary devices, thereby allowing quick returning transition to the previous ON state. A transition from the ON state to the suspend state or the hibernation state is referred to as suspend or hibernation, while a transition from the suspend state or the hibernation state to the ON state is collectively referred to as resume.

In the present specification, suspend and hibernation will be collectively referred to as sleep. The sleep also includes a state where, when it transitions to the suspend state, the system states are stored in the HDD 42 as well as the main memory 35. In this sleep state, when information stored in the main memory 35 is available, the EC 49 can quickly resume its operation by using the information, and when the information stored in the main memory 35 is lost due to any reasons, it can resume its operation by using information stored in the HDD 42.

The I/O controller 65 is connected to the input device 15 such as a keyboard or a mouse. The flash ROM 63 is a nonvolatile memory, in which the stored contents are electrically rewritable, and stores therein a system BIOS, which is a basic program used for activation and management of a system; various utilities, which are software components for managing power supply, temperature of a casing, and the like, a POST (Power-On Self Test), which is a software component for testing or initializing hardware components when the notebook PC 10 is activated.

Figure 3:
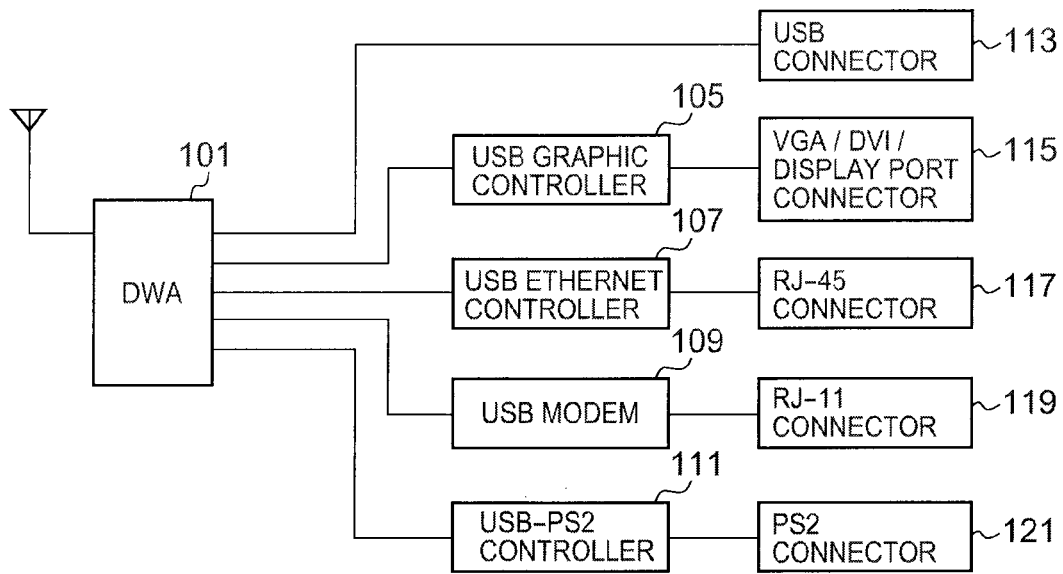
FIG. 3 is a block diagram illustrating an internal configuration of the wireless extension device.

FIG. 3 is a block diagram according to an embodiment of the present invention, illustrating an internal configuration of the wireless extension device 100. A DWA (Device Wire Adaptor) 101 is provided with a UWB wireless platform at its upstream port to be able to communicate with the WUSB host controller 41 by wireless and a wired USB interface at its downstream port to be able to function as a wired USB host controller so that a wired USB device can be connected to the WUSB host controller 41 by wireless. The DWA 101 is connected to a USB graphic controller 105, a USB Ethernet controller 107, a USB modem 109, and a USB-PS2 controller 111, which are wired USB devices.

Although the size of packets transmitted between the WUSB host controller 41 and the DWA 101 is set larger than that of the wired USB protocol in order to improve wireless transmission efficiency, the DWA 101 is able to bi-directionally convert the WUSB packet size and the wired USB packet size. The USB graphic controller 105 is connected to a VGA/DVI/display port connector 115, the USB Ethernet controller 107 is connected to an RJ-45 connector, the USB modem 109 is connected to an RJ-11 connector, and the USB-PS2 controller 111 is connected to a PS2 connector. Moreover, the DWA 101 is connected to a USB connector 113 to which the HDD 24 is connected. The VGA/DVI/display port connector 115 is connected to the display 25, the RJ-45 connector is connected to an Ethernet cable for connecting to the wired LAN 22, the RJ-11 connector is connected to a modem cable for connecting to the public telephone line 23, and the PS2 connector is connected to the keyboard 26 and the mouse 27.

The USB graphic controller 105 is provided with a graphic accelerator and a VRAM, and is configured to receive a drawing command from the CPU 31 to produce images to be drawn and write the images in the VRAM and to deliver drawing data read out of the VRAM to the display 25. The USB Ethernet controller 107 produces an Ethernet MAC frame to thereby control communications with the wired LAN 22. The USB modem 109 bi-directionally converts an audio signal and a digital signal to thereby control communications to the public telephone line 23. The USB-PS2 controller 111 converts signals received from the standard PS2 keyboard 26 and the standard PS2 mouse 27 to signals compatible with the wired USB protocol.

Figure 4:
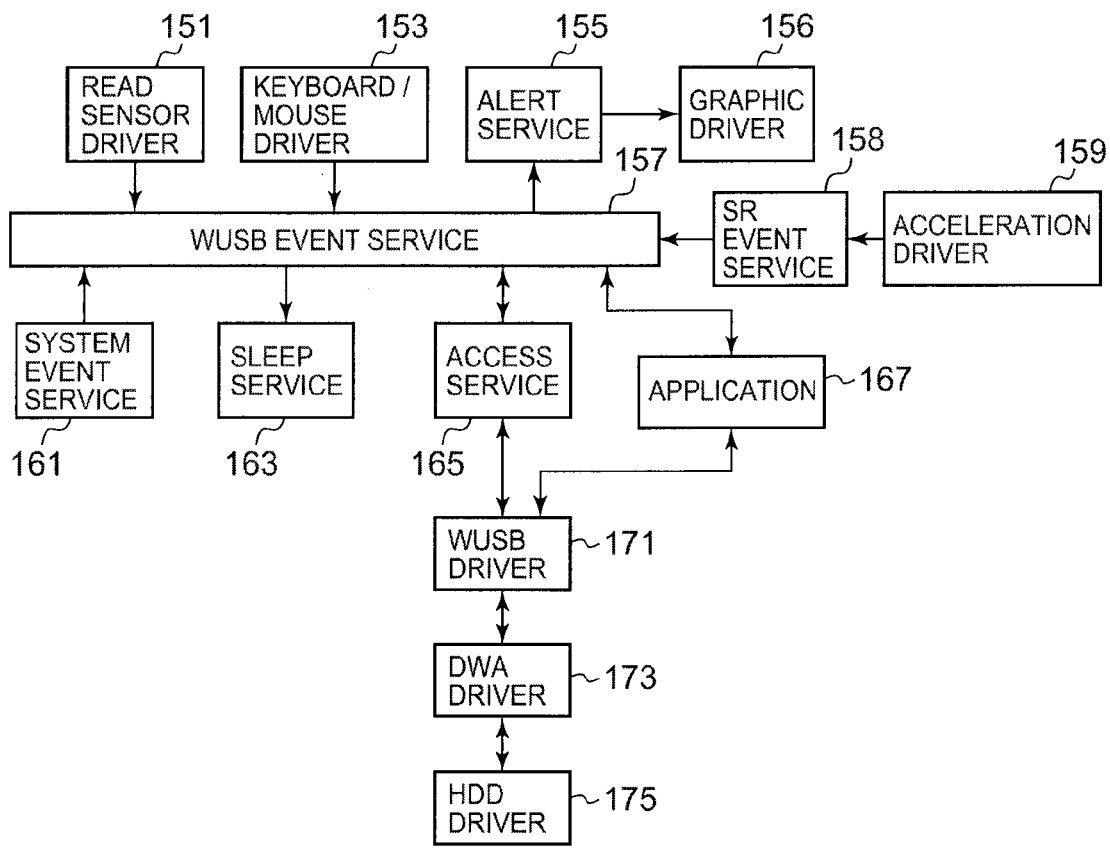
FIG. 4 is a functional block diagram illustrating a configuration of the main software components of the notebook PC according to an embodiment of the present invention.

FIG. 4 is a functional block diagram illustrating a configuration of main software components of the notebook PC 10 according to an embodiment of the present invention. These software components are stored in the HDD 42 or the flash ROM 63 and executed by the CPU 31 and the EC 53. A WUSB event service 157 is a utility software component running on the OS and performs a major function of the present invention. Software components other than a WUSB event service 157, a SR event service 158, and an application 167 may be implemented by the functions offered by the OS or the BIOS or software components provided by a device maker.

A read sensor driver 151 is a software component that produces an opening/closing signal when the read sensor 21b operates in response to a change in a distance to the permanent magnet 21a. The keyboard/mouse driver 153 is a software component that processes signals transmitted from the input device 15, the keyboard 26, or the mouse 27. A graphic driver 156 is a software component that controls the LCD 17 or the display 25.

An acceleration driver 159 is a software component that produces acceleration data from the acceleration measured by the acceleration sensor 51 and outputs the acceleration data to the EC 53. The SR event service 158 produces removal information from the acceleration data received from the acceleration driver 159, the removal information indicating a possibility of the occurrence of a surprise removal. Here, the surprise removal refers to taking a notebook PC, which is connected to a device by wireless and in an ON state or a sleep state, and placing it outside its wireless communication zone without a safe device removal operation. An ejection operation is one method of carrying out the safe removal.

The ejection operation refers to the operation of disconnecting a wireless communication path in a state where the device can be physically and logically safely removed from the notebook PC 10. The ejection operation includes removing the device in the case of an external storage device from the notebook PC 10 after data under editing is saved or data for which reading has been started is completely read into the main memory 35. The SR event service 158 is configured by a well-known algorithm capable of detecting, as an acceleration, a state when the notebook PC 10 placed on a desk is carried by a user to outside of its wireless communication zone. The algorithm may be configured to detect a change in the position of the notebook PC 10 when it is lifted upward by the user from a state of being situated parallel to the desk, by means of a change in the acceleration.

A system event service 161 is a software component that produces a sleep event wherein the notebook PC 10 transitions to a suspend state or a hibernation state based on a predetermined condition. The system event service 161 produces the sleep event for the suspend or hibernation, for example, when a user has not accessed the notebook PC 10 for a predetermined time period or when the voltage of the battery 57 has decreased to a predetermined value. The sleep event may be produced by the function of the read sensor driver 151 in response to opening/closing of the display casing 13 or the function of the keyboard/mouse driver 153 in response to a user operation.

A sleep service 163 is a software component that stores the application and system states in both or either of the main memory 35 and the HDD 42 upon receipt of the sleep event from the WUSB event service 157 and stops the supply of electric power to devices other than the devices defined as the sleep state. An access service 165 is a software component that performs an ejection operation of separating devices connected to the notebook PC 10 via the wireless extension device 100 from the notebook PC 10 based on an instruction from the WUSB event service 157.

A WUSB driver 171, a DWA driver 173, and a HDD driver 175 are software components for controlling the WUSB host controller 41, the DWA 101, and the HDD 24, respectively. The application 167 is a software component that runs on the OS to access the HDD 42 or the HDD 24.

Figure 5:
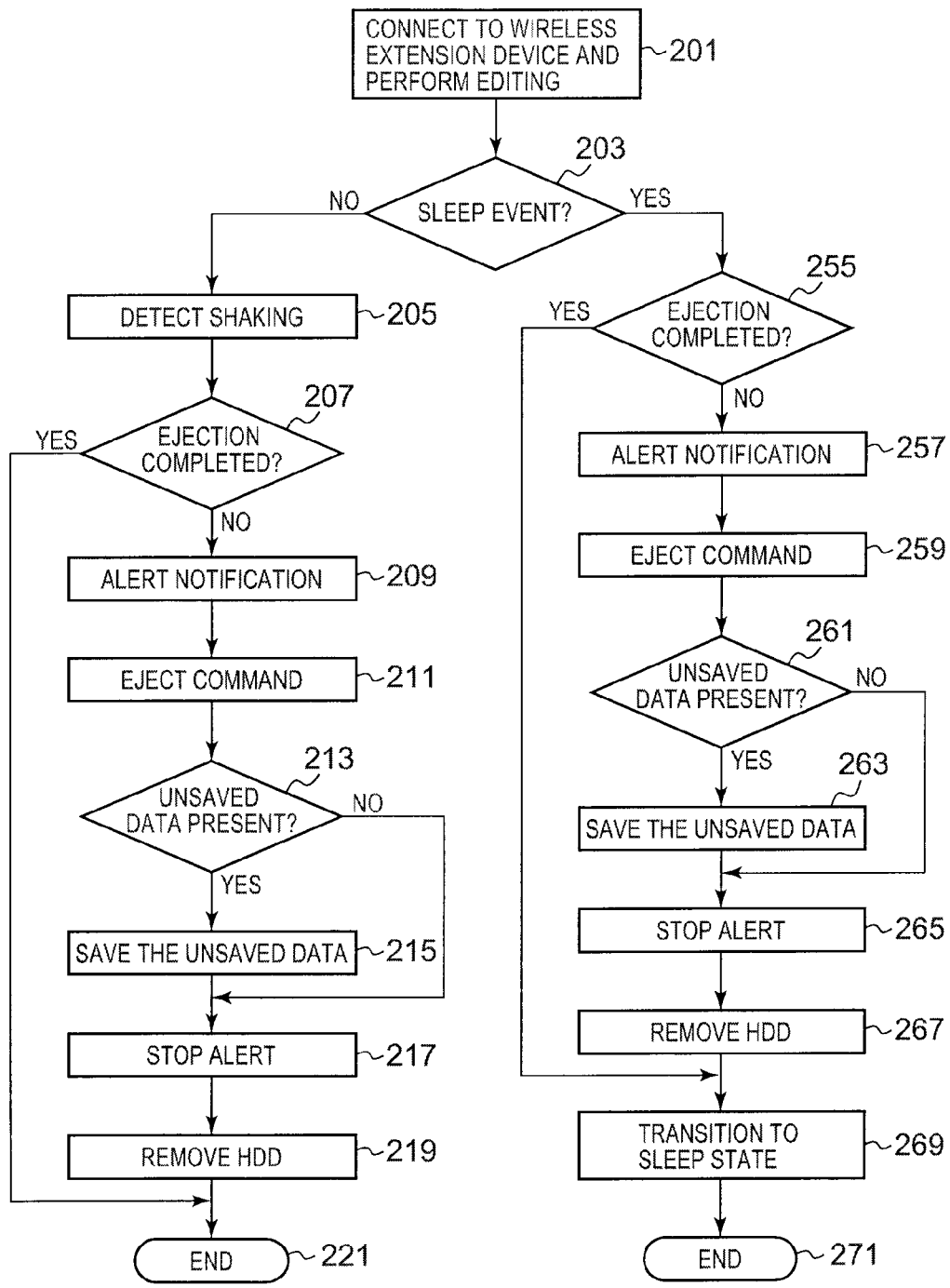
FIG. 5 is a flow chart illustrating the procedures of the notebook PC accessing an HDD by means of the software components of FIG. 4.

Next, a description of the procedures of the notebook PC 10 accessing the HDD 24 by execution of the software components of FIG. 4 will be provided with reference to the flow chart illustrated in FIG. 5. At block 201, the notebook PC 10 transitions to an ON state and the software components illustrated in FIG. 4 are run by the CPU 31 or the EC 53. The respective connectors of the wireless extension device 100 are connected to the Ethernet cable, the HDD 24, the display 25, the keyboard 26, and the mouse 27. When a distance between the notebook PC 10 and the wireless extension device 100 is within the UWB communication range, the access service 165 performs cross-authentication between each wired USB device and the WUSB host controller 41 to thereby complete association. When association is completed, encrypted wireless communications can be made between the respective wired USB devices and the WUSB host controller 41. Moreover, a pipe as a logical connection is established between the WUSB driver 171 and the HDD driver 175.

Upon recognizing that the pipe has been established between the WUSB driver 171 and the HDD driver 175, the access service 165 notifies the WUSB event service 157 of connection information indicating that a wireless communication path has been configured between the notebook PC 10 and the HDD 24. The notebook PC 10 can access the HDD 24 from the display 25, the keyboard 26, and the mouse 27 in a closed state of the display casing 13 and from the LCD 17 and the input device 15 in the opened state of the display casing 13. Then, the user can read files stored in the HDD 24 into the main memory 35 by means of the application 167 and edit the files. The WUSB event service 157 receives ID information from applications accessing the HDD 24 to thereby recognize which applications are currently accessing the HDD 24.

Here, it is assumed that the surprise removal occurs when the notebook PC 10 is in the ON state or the sleep state. When it is determined that the sleep event has not been produced, the flow proceeds to block 205, where the WUSB event service 157 waits for the removal information indicating the possibility of a surprise removal occurring. Because the surprise removal usually occurs when the user lifts up the notebook PC 10 so that shaking occurs, the acceleration sensor 51 measures the shaking as an acceleration. At block 205, the acceleration driver 159 notifies the EC 49 of the acceleration data measured by the acceleration sensor 51, and the EC 49 stores the acceleration data in the RAM. The SR event service 158 periodically reads the acceleration data from the EC 49 to thereby produce the removal information by distinguishing the acceleration resulting in the surprise removal from other accelerations resulting from impact or the like and notifies the WUSB event service 157 of the removal information.

At block 207, when the WUSB event service 157 has not received the connection information indicating that the HDD 24 is connected, from the access service 165, the determination is made that the HDD 24 has been ejected. Since the surprise removal might not occur if the HDD 24 has already been ejected from the notebook PC 10, the flow proceeds to block 221 and ends without performing any operations. If the WUSB event service 157 has received the connection information from the access service 165, it is determined at block 207 that the HDD 24 is connected, and the flow proceeds to block 209.

When the WUSB event service 157 receives the removal information from the SR event service 158 in a state where it has received the connection information from the access service 165, indicating that the wireless communication path has been configured between the HDD 24 and the notebook PC 10, the WUSB event service 157 sends an alert event to the alert service 155 at block 209. Upon receiving the alert event, the alert service 155 activates both or either of a non-illustrated LED and a non-illustrated buzzer to thereby notify a user of an alert indicating the possibility of a surprise removal occurring.

The alert may be notified by lighting the LED formed on a surface of the display casing 13 or ringing the buzzer if the notebook PC 10 is closed. The alert service 155 further displays on the LCD 17 or the display 25, by means of the graphic driver 156, information indicating that it is necessary to save data being edited to the HDD 24, or information indicating that it is necessary to finish reading data being read, in response to the occurrence of the surprise removal. At this time, the information is displayed on the LCD 17 if the notebook PC 10 is opened, or is displayed on the display 25 if the notebook PC 10 is closed.

By receiving the alert, the user can recognize that it is then necessary to not disconnect the wireless communication between the notebook PC 10 and the wireless extension device 100 until the ejection operation of the HDD 24 is completed. Since the wireless communication path between the notebook PC 10 and the HDD 24 is effective only for a period of time required for the ejection operation, the user can prevent the occurrence of a surprise removal by placing the notebook PC 10 being held upward back on the desk or regulating the speed of movement.

At block 211, the WUSB event service 157 instructs the access service 165 to eject the HDD 24. Upon receiving the instruction, the access service 165 makes inquiries to the HDD driver 175 as to whether it is okay to remove the HDD 24. Then, the HDD driver 175 sends a notification to all applications accessing the HDD 24, that the HDD 24 will be removed. When it is determined at block 213 that there is data being edited or files being read with respect to the HDD 24, the application 167 having received the removal notification from the HDD 24 and other applications notify the WUSB event service 157 of the presence and the flow proceeds to block 215. When the data being edited or the files being read are not present, the applications notify the access service 165 of the non-presence and the flow proceeds to block 217.

Upon receiving notification of the presence of data being edited from the application, the WUSB event service 157 instructs the application 167 to save the data being edited at block 215. At block 215, the application 167 saves the data being edited to the HDD 24 based on the instruction of the WUSB event service 157. Moreover, when there are files being edited, a notification of ejection permission is sent to the WUSB event service 157 at a time point when the saving of the data being edited and the files being read are completed.

When it is confirmed that the notification of ejection permission has been received from all of the applications accessing the HDD 24, the WUSB event service 157 instructs, at block 217, the alert service 155 to stop the alert notified at block 209. By the stopped alert, the user can recognize that it is safe even when the notebook PC 10 is carried outside of the wireless communication zone.

At block 219, the WUSB event service 157 instructs the access service 165 to eject the HDD 24. Upon receiving the instruction, the access service 165 stops the HDD driver 175 so that the HDD 24 is no longer recognized by the notebook PC 10 to thereby complete the ejection operation. At block 221, the access service 165 sends a notification to the WUSB event service 157, indicating that the removal of the HDD 24 has been completed, to thereby complete the operation of preventing occurrence of the surprise removal in the ON state.

According to the procedures of blocks 203 to 215, if a period of time required for the user to carry the notebook PC 10 outside of the wireless communication zone is longer than a period of time consumed for the operations of blocks 205 to 215, the data being edited left in the main memory 35 is saved to the HDD 24, so that data is not lost due to the user's operation errors and it is thus safe. Moreover, the data is safe unless the user carries the notebook PC 10 outside of the wireless communication zone against the alert. Furthermore, since the files being read are completely read into the main memory 35, the data of the main memory 35 can be read or stored on the HDD 42 outside of the wireless communication zone.

When the sleep event is produced at block 203 in a state of being connected to the wireless extension device 100, the flow proceeds to block 255. The sleep event as an event for causing the notebook PC 10 to transition from the ON state to the sleep state may be generated by the system event service 161, the read sensor driver 151, or the keyboard/mouse driver 153. The user may preset the conditions under which the read sensor driver 151 and the system event service 161 produce the sleep event.

For example, the system event service 161 produces the sleep event when an idle period of the notebook PC 10 exceeds a predetermined value or when the voltage of the battery 57 has decreased to lower than a predetermined value. The read sensor driver 151 may be configured to produce the sleep event when the display casing 13 is closed. The keyboard/mouse driver 153 may be configured to produce the sleep event when a predetermined key has been operated. At block 203, a sleep event produced due to any of the reasons is transmitted to the WUSB event service 157.

At block 255, the WUSB event service 157 determines that the HDD 24 has been ejected when it has not received the connection information from the access service 165, indicating that the HDD 24 is connected. The ejection of the HDD 24 may be an ejection by the operation of block 219 or an ejection carried out by the user's operation of the input device 15 or the mouse 27. When the HDD 24 has already been ejected from the notebook PC 10 at block 255, the flow proceeds to block 269. When it is determined that the HDD 24 is connected, the WUSB event service 157 performs the operation of block 257.

When the WUSB event service 157 receives the sleep event from the system event service 161, the read sensor driver 151, or the keyboard/mouse driver 153 in a state where it has received the connection information from the access service 165, indicating that the wireless communication path has been configured between the HDD 24 and the notebook PC 10, the WUSB event service 157 sends an alert event to the alert service 155 at block 257. Upon receiving the alert event, the alert service 155 activates both or either of the LED and the buzzer to thereby notify a user of an alert indicating that the sleep event has occurred in a state where the notebook PC 10 accesses the HDD 24. The user can then recognize from this alert that when it transitions to the sleep state and the resume function is performed outside the wireless communication zone without completing the ejection operation, there is a possibility that data may be lost from the main memory 35.

The WUSB event service 157 holds execution of the sleep event for a moment and instructs the access service 165 to eject the HDD 24 at block 259. Upon receiving the instruction, the access service 165 makes inquiries to the HDD driver 175 as to whether it is okay to remove the HDD 24. Then, the HDD driver 175 sends a notification to the all applications accessing the HDD 24 that the HDD 24 will be removed. When it is determined at block 261 that there is data being edited or data being read with respect to the HDD 24, the application 167 having received the removal notification from the HDD 24 and other applications notify the WUSB event service 157 of the presence and the flow proceeds to block 263. When the data being edited or the files being read are not present, the applications notify the access service 165 of the ejection permission and the flow proceeds to block 265.

Upon receiving the notification of the presence of data being edited from the application 167, the WUSB event service 157 instructs the application 167 to save the data being edited at block 261. At block 263, the application 167 saves the data being edited to the HDD 24 based on the instruction of the WUSB event service 157. Moreover, when there are files being read, a notification of ejection permission is sent to the WUSB event service 157 at a time point when the saving of the data being edited and the reading of files being read is completed.

When it is confirmed that the notification of ejection permission has been received from all of the applications accessing the HDD 24, the WUSB event service 157 instructs, at block 265, the alert service 155 to stop the alert issued at block 257. By the stopped alert, the user can recognize that it is safe even when the notebook PC 10 is carried outside of the WUSB communication zone in the sleep state.

At block 267, the WUSB event service 157 instructs the access service 165 to eject the HDD 24. Upon receiving the instruction, the access service 165 stops the HDD driver 175 so that the HDD 24 is no longer recognized by the notebook PC 10 to thereby complete the ejection operation. The stopping of the alert at block 265 may be carried out after block 267 where the HDD 24 is ejected. The access service 165 sends a notification to the WUSB event service 157, indicating that the removal of the HDD 24 has been completed.

When it is confirmed that the HDD 24 has been removed, the WUSB event service 157 instructs, at block 269, the sleep service 163 to cause the notebook PC 10 to transition to the sleep state. Upon receiving the instruction, the sleep service 163 causes the notebook PC 10 to transition to the sleep state, and the flow ends (block 271). If the sleep event is executed when there is data being edited with respect to the HDD 24, the notebook PC 10 will transition to the sleep state while the unsaved data is not saved. Moreover, when the resume function is performed outside the communication zone of the wireless extension device 100, there is a possibility that the data may be lost from the main memory 35.

The production of removal information in the sleep state can be made possible by supplying electric power to the acceleration sensor 51 and the EC 49 in the sleep state. However, for the ejection operation to be performed based on the removal information, it is necessary to resume for a moment for execution of the software components of FIG. 4. Since the resume function consumes a predetermined time period, a certain period of time may be required for the resume function to be performed to carry out the ejection operation after the removal information is produced. However, according to the procedures of blocks 203 to 271, the ejection operation must be performed before entering into the sleep state. Therefore, even when the notebook PC 10 is moved outside the wireless communication zone in the sleep state, the surprise removal may not occur, so that, when the resume function is performed, the data being edited may not be lost from the main memory 35 due to the user's operational errors.

According to the procedures of FIG. 5, according to an embodiment of the present invention, the ejection operation is performed in the ON state or the sleep state before the surprise removal occurs so that the HDD 24 can be safely removed. Next, a description of a method for preventing occurrence of the surprise removal without intervention of the ejection operation according to another embodiment of the present invention will be provided.

Figure 6:
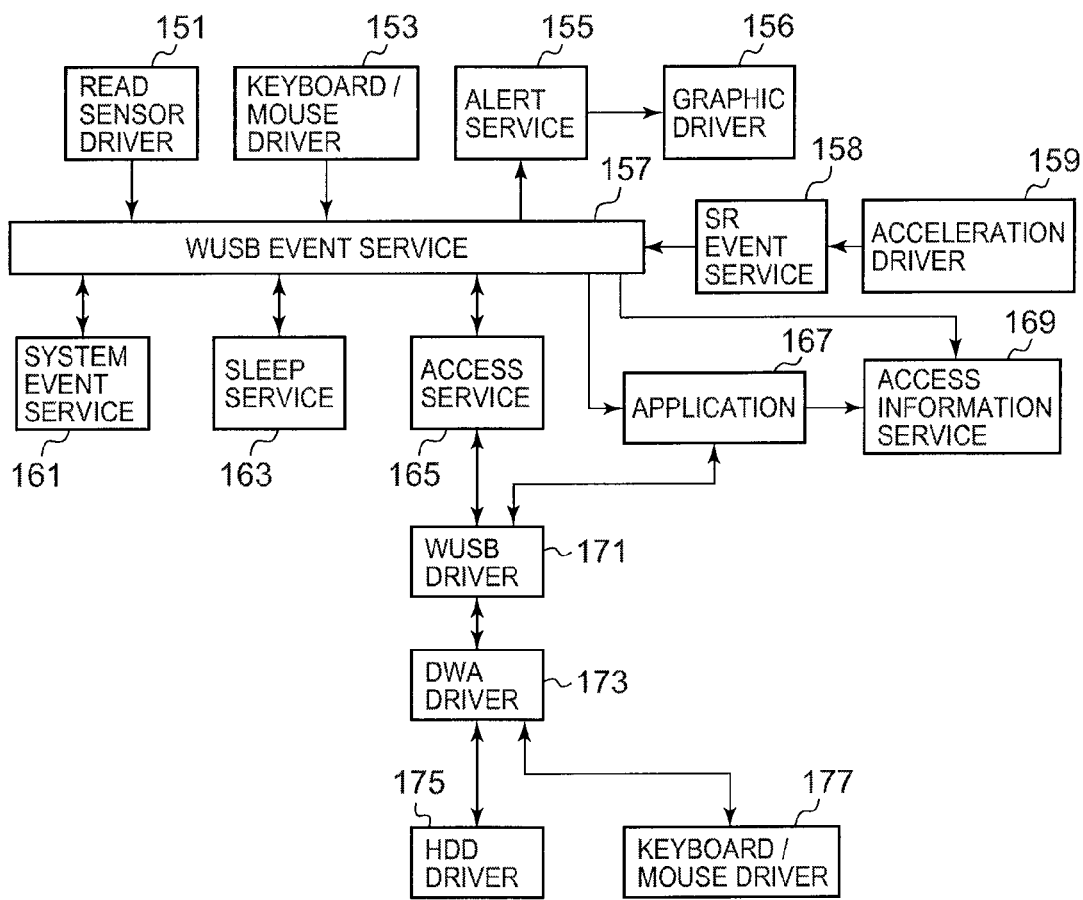
FIG. 6 is a functional block diagram illustrating a configuration of main software components of the notebook PC according to another embodiment of the present invention.

FIG. 6 is a functional block diagram according to an embodiment of the present invention illustrating a configuration of software components for executing the method. FIG. 6 is different from FIG. 4, in that an access information service 169 which is a software component that receives and stores an access information from the entire applications, indicating whether or not the applications access the HDD 24 is provided, and that the operation of the WUSB event service 157 is different. Moreover, the WUSB event service 157 is allowed to refer to data held by the access information service 169.

Figure 7:
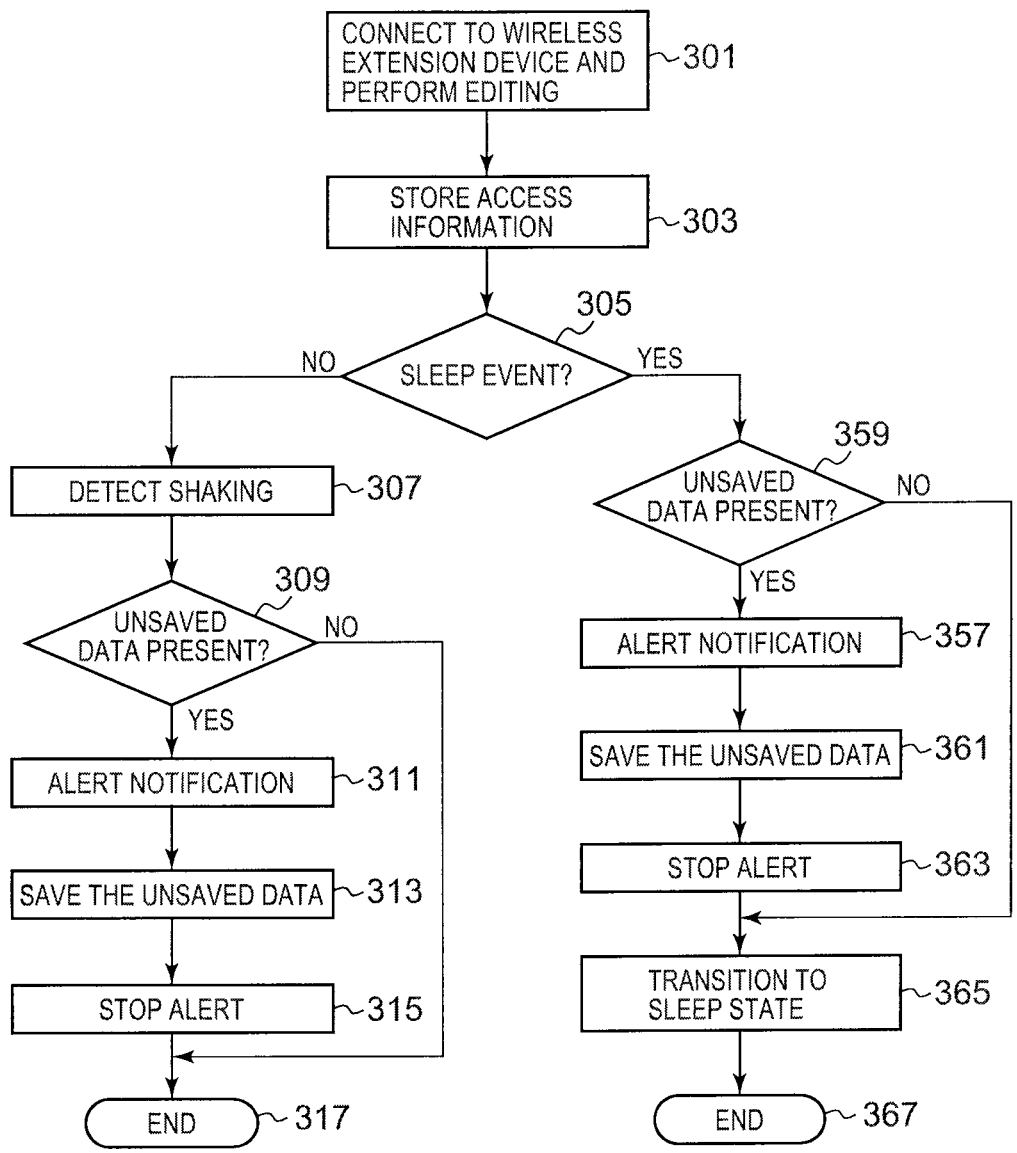
FIG. 7 is a flow chart illustrating the procedures of the notebook PC accessing an HDD by means of the software components of FIG. 6.

A description of the procedures for preventing the surprise removal based on the software component structure illustrated in FIG. 6 will be provided with reference to the flow chart of FIG. 7. The operation of block 301 is the same as that of block 201. At block 303, the applications edit files read from the HDD 24, and when there is data being edited with respect to the HDD 24, notify the access information service 169 of the presence. The access information service 169 stores the presence information together with attribute information of the applications as access information in the main memory 35.

When the applications have saved the data being edited with respect to the HDD 24, they notify the access information service 169 of the saving, and then the access information service 169 having received the notification resets the access information of the applications. Therefore, the access information service 169 holds only the access information of the applications in which the data being edited with respect to the HDD 24 is present at the present time point.

The operations of blocks 305 and 307 are the same as those of blocks 203 and 205, respectively. At block 309, the WUSB event service 157 makes inquiries to the access information service 169 as to whether or not the data under editing with respect to the HDD 24 is present in any of the applications. When any of the applications is holding the data under editing with respect to the HDD 24, the WUSB event service 157 instructs, at block 311, the alert service 155 to issue an alert. The content of the alert is the same as that of block 209.

When the WUSB event service 157 instructs, at block 313, the applications holding the data being edited to save the data, the applications save the data in the HDD 24 and notify the access information service 169 of the result. At block 315, when as a result of the inquiries made to the access information service 169, it is confirmed that there is no application holding the data being edited with respect to the HDD 24, the WUSB event service 157 stops the alert via the alert service 155, and the flow ends at block 317.

When the sleep event is produced at block 305, the flow proceeds to block 359, where the WUSB event service 157 makes inquiries to the access information service 169 so as to confirm whether or not the applications holding the data being edited are present. When there is no application holding the data being edited, the flow proceeds to block 365, where the WUSB event service 157 instructs the sleep service 163 to cause the notebook PC 10 to transition to the sleep state, and then the sleep service 163 causes the notebook PC 10 to transition to the sleep state, and the flow ends at block 365.

When there is an application holding the data being edited at block 359, the flow proceeds to block 357. The operations of blocks 357 to 363 are the same as those of blocks 311 to 315. According to the procedures of FIG. 7, by the introduction of the access information service 169, it is possible to prevent loss of data being edited without intervention of the ejection operation.

Although the wireless communication between the notebook PC 10 and the wireless extension device 100 has been described with respect to the WUSB, the present invention may be applied to other application layers such as 1394 TA (Trade Association) or Bluetooth using the UWB in the physical layer. Moreover, the present invention can be applied to a case where both the notebook PC 10 and the wireless extension device 100 are connected by communication using a MIMO (Multiple Input Multiple Output)-based wireless LAN technique. Furthermore, although the wireless extension device 100 has been described with respect to a configuration that uses the DWA 101, the DWA may not be used and respective devices may be configured as so-called wireless USB devices each having a wireless communication portion using the WUSB protocol.

In addition, the removal information may be produced by using electric waves or infrared rays as long as they allow the notebook PC 10 to recognize that the distance between the notebook PC 10 and the wireless extension device 100 has changed. Although the present invention has been described so far in accordance with embodiments illustrated in drawings, the invention is not limited to the embodiments illustrated in the drawings. As a matter of course, any known configurations may be used as long as the functions of the present invention are executed thereby.

While the present invention has been shown and described by way of particular preferred embodiments in conjunction with the drawings, the present invention is not limited to the disclosed embodiments. It is to be understood that the present invention may employ any configurations known in the art as long as they can attain the effects of the present invention, for example the present invention can be used in an electronic apparatus such as a portable computer or a mobile phone.

Aspects of the present invention may be provided as a tangible computer program product which may include a machine-readable medium having stored thereon instructions which may be used to program a computer (or other electronic devices) to perform a process according to the any of the embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, aspects of the present invention may also be downloaded as a computer program product, wherein the program may be transferred from a remote computer to a requesting computer by way of data signals embodied in a carrier wave or other propagation medium via a communication link (e.g., a modem or network connection).

If not otherwise stated herein, it is to be assumed that all patents, patent applications, patent publications and other publications (including web-based publications) mentioned and/or cited herein are hereby fully incorporated by reference herein as if set forth fully in their entirety herein.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

What is claimed is:

1. A method comprising:
   configuring wireless communication between one or more external storage devices and a computer;
   accessing the one or more external storage devices from the computer;
   producing removal information at the computer, wherein the removal information is based upon a distance between the computer and the one or more external devices and wherein the removal information indicates a potential loss of wireless communication between the computer and the one or more external storage devices before ejection of the one or more external storage devices; and
   preventing a surprise removal in response to the removal information by automatically, without a user providing input to manually eject the one or more external storage devices, providing a notification indicating a potential loss of data being edited and communicated between the computer and the one or more external storage devices, saving the data being edited and communicated, ejecting the one or more external storage devices, and stopping the provision of the notification after the data being edited and communicated has been saved.

2. The method according to claim 1, wherein producing removal information comprises indicating that the computer is moving away from at least one of the one or more external storage devices.

3. The method according to claim 1, wherein producing removal information comprises measuring an acceleration occurring in the computer.

4. The method according to claim 1, wherein producing removal information comprises measuring a strength of a wireless signal in order to determine the distance between the computer and the one or more external storage devices.

5. The method according to claim 1, further comprising:
configuring an alert to indicate a potential for a surprise removal;
wherein the ejecting the one or more external storage devices is responsive to the user acknowledging the alert and the data being saved.

6. The method according to claim 1, wherein accessing comprises reading and editing data stored on the one or more external storage devices.

7. The method according to claim 1, further comprising the steps of:
producing a sleep event;
ejecting the one or more external storage devices in response to the sleep event; and
executing the sleep event in response to completion of the ejection.

8. The method according to claim 7, wherein an alert indicates a potential for a surprise removal.

9. The method according to claim 8, wherein accessing comprises reading and editing data stored on the one or more external storage devices.

10. The method according to claim 9, further comprising saving the data to the one or more external storage devices prior to execution of the sleep event.

11. An apparatus, comprising:
a connection recognition arrangement that recognizes that one or more external storage devices are connected wirelessly to the apparatus; and
a displacement recognition arrangement that provides removal information at the apparatus, wherein the removal information is based upon a distance between the apparatus and the one or more external devices and wherein the removal information indicates a potential loss of wireless communication between the apparatus and the one or more external storage devices before ejection of the one or more external storage devices; and
a surprise removal prevention arrangement that prevents a surprise removal based on the removal information through an ejection arrangement that saves data being edited to the one or more external storage devices;
wherein the ejection arrangement automatically, without a user providing input to manually eject the one or more external storage devices, provides a notification indicating a potential loss of data being edited and communicated between the computer and the one or more external storage devices, saves the data being edited and communicated, ejects the one or more external storage devices, and stops the provision of the notification after the data being edited and communicated has been saved.

12. The apparatus according to claim 11, wherein the displacement recognition arrangement is configured to recognize that the apparatus is moving away from at least one of the one or more external storage devices.

13. The apparatus according to claim 11, wherein the displacement recognition arrangement comprises an acceleration sensor that detects a change in the position of the apparatus.

14. The apparatus according to claim 11, wherein the displacement recognition arrangement comprises a wireless signal measurement arrangement that measures wireless signal strength in order to determine a distance between the apparatus and the one or more external storage devices.

15. The apparatus according to claim 11, further comprising:
a notifying arrangement that generates an alert;
wherein the alert comprises indicating a potential for surprise removal; and
wherein the ejection arrangement is configured to eject the one or more external storage devices in response to an output of the displacement recognition arrangement.

16. The apparatus according to claim 15, wherein the ejection arrangement is configured to save data to the one or more external storage devices prior to ejecting the one or more external storage devices.

17. The apparatus according to claim 11, wherein the sleep execution arrangement is configured to execute the sleep event responsive to ejection of the one or more external storage devices;
wherein the ejection arrangement saves data to the one or more external storage devices prior to executing the sleep event; and
wherein at least one of the one or more external storage devices is connected by wire to a wireless extension device provided with a plurality of external terminals, and the apparatus is connected to the at least one external storage device connected to the wireless extension device via the wireless extension device.

18. A program storage device readable by machine, tangibly embodying a program of instructions executed by the machine, the program of instructions comprising:
code that configures wireless communication between one or more external storage devices and a computer;
code that accesses the one or more external storage devices from the computer;
code that produces removal information at the computer, wherein the removal information is based upon a distance between the computer and the one or more external devices and wherein the removal information indicates a potential loss of wireless communication between the computer and the one or more external storage devices before ejection of the one or more external storage devices; and
code that prevents a surprise removal in response to the removal information by automatically, without a user providing input to manually eject the or more external storage devices, provides a notification indicating a potential loss of data being edited and communicated between the computer and the one or more external storage devices, saves the data being edited and communicated, ejects the one or more external storage devices, and stops the provision of the notification after the data being edited and communicated has been saved.

19. The program storage device according to claim 18, further comprising:
code that produces a sleep event, wherein initiating the sleep event causes at least one of the one or more external storage devices to be ejected from the computer.

* * * * *